US012155348B2

(12) United States Patent
Wartena et al.

(10) Patent No.: US 12,155,348 B2
(45) Date of Patent: Nov. 26, 2024

(54) DEVICE AND METHODS FOR ARTICULATING SOLAR PHOTOVOLTAIC ARRAYS WITH BALANCED HORIZONTAL SCISSOR CANTILEVER BEAMS

(71) Applicant: Southern Beams Builds, Inc., San Francisco, CA (US)

(72) Inventors: Ryan Wartena, San Francisco, CA (US); Zachary Coffin, Alameda, CA (US); Andrew Taylor Moore, Gerlach, NV (US)

(73) Assignee: SOUTHERN BEAMS BUILDS INC., San Francisco, CA (US)

( * ) Notice: Subject to any disclaimer, the term of this patent is extended or adjusted under 35 U.S.C. 154(b) by 0 days.

(21) Appl. No.: 18/217,978

(22) Filed: Jul. 3, 2023

(65) Prior Publication Data

US 2024/0283397 A1    Aug. 22, 2024

Related U.S. Application Data

(60) Provisional application No. 63/447,123, filed on Feb. 21, 2023.

(51) Int. Cl.
*H02S 30/20* (2014.01)
*H02S 20/30* (2014.01)

(52) U.S. Cl.
CPC .............. *H02S 30/20* (2014.12); *H02S 20/30* (2014.12)

(58) Field of Classification Search
CPC ................................ H02S 10/40; H02S 30/20
See application file for complete search history.

(56) References Cited

U.S. PATENT DOCUMENTS

2017/0063290 A1* 3/2017 Kurlagunda ............ B60L 8/003
2019/0326846 A1* 10/2019 Ansari .................... C02F 1/006
(Continued)

FOREIGN PATENT DOCUMENTS

CN    107276499 A  * 10/2017
CN    109525185 A  *  3/2019
(Continued)

OTHER PUBLICATIONS

English machine translation of Chen (CN-114389178-A) provided by the EPO website, 2023, All Pages. (Year: 2023).*
(Continued)

*Primary Examiner* — Daniel P Malley, Jr.
(74) *Attorney, Agent, or Firm* — Imperium Patent Works LLP; Mark D. Marrello

(57) ABSTRACT

An apparatus includes a plurality of solar panels, a horizontal scissor configured to support the plurality of solar panels, and an electronic drive motor that is configured to cause the horizontal scissor to extend or retract. The horizontal scissor includes a plurality of beams. The apparatus also includes a drive shaft and drive screw which are configured to extend or retract the horizontal scissor in response to movement of the electronic drive motor. The horizontal scissor and the electronic drive motor are coupled to a standard size unit shipping container. A first beam of the plurality of beams is made of a first material, and a second beam of the plurality of beams is made of a second material. The horizontal scissor is configured so that when fully retracted it fits into one half of the volume available inside the standard size shipping container.

16 Claims, 8 Drawing Sheets

PERSPECTIVE VIEW OF
ARTICULATING SCISSOR SOLAR ARRAY IN OPEN POSITION

(56) References Cited

U.S. PATENT DOCUMENTS

2019/0379324 A1* 12/2019 Al-Haddad ............. F24S 20/50
2022/0069766 A1*  3/2022 Mullings ................. B60K 6/40

FOREIGN PATENT DOCUMENTS

| CN | 215798224 U | * | 2/2022 |
| CN | 114389178 A | * | 4/2022 |
| CN | 114915236 A | * | 8/2022 |

OTHER PUBLICATIONS

English machine translation of Guo (CN-109525185-A) provided by the EPO website, 2023, All Pages. (Year: 2023).*

English machine translation of Xu (CN-107276499-A) provided by the EPO website, 2023, All Pages. (Year: 2023).*

Falcon Structures, "Common Shipping Container Specs", https://www.falconstructures.com/shipping-container-dimensions#:~:text=Most%20commonly%2C%20containers%20are%20around,or%20create%20better%20air%20circulation., 2020, All pages. (Year: 2020).*

English machine translation of Wang (CN 215798224 U) provided by the EPO website, 2023, All Pages. (Year: 2023).*

English machine translation of Liu (CN-114915236-A) provided by the EPO website, 2024, All Pages. (Year: 2024).*

* cited by examiner

PERSPECTIVE VIEW OF ARTICULATING SCISSOR SOLAR ARRAY IN OPEN POSITION

TOP DOWN VIEW OF ARTICULATING SCISSOR SOLAR ARRAY IN OPEN POSITION

FRONT VIEW OF ARTICULATING SCISSOR SOLAR ARRAY IN OPEN POSITION

SIDE VIEW OF ARTICULATING SCISSOR SOLAR ARRAY IN CLOSED POSITION

SIDE VIEW OF
ARTICULATING SCISSOR SOLAR ARRAY IN CLOSED POSITION

DEVICE AND METHODS FOR ARTICULATING SOLAR PHOTOVOLTAIC ARRAYS WITH BALANCED HORIZONTAL SCISSOR CANTILEVER BEAMS

CROSS REFERENCE TO RELATED APPLICATIONS

This application is a continuation-in-part and claims priority under 35 U.S.C. 120 from provisional U.S. patent application Ser. No. 63/447,123, entitled "DEVICE & METHODS FOR ARTICULATING SOLAR PV ARRAYS WITH BALANCED HORIZONTAL SCISSOR CANTILEVER BEAMS", filed on Feb. 21, 2023, the subject matter of which is incorporated by reference.

TECHNICAL FIELD

The present invention is directed to devices and methods for articulating solar photovoltaic (PV), array centrally supported and balanced with horizontal scissor cantilever beams that deploy hinged PV panels allowing for rapid opening and closing using a quad scissor deployment system driven by electric drive motor(s).

BACKGROUND INFORMATION

The need for solar power generation is growing rapidly, however, the currently available solutions require expensive and time consuming deployment. Moreover, current solar power generation deployments are stationary and not easy nor cost efficient to relocate.

SUMMARY

In a first novel aspect, an apparatus includes a plurality of solar panels, a horizontal scissor configured to support the plurality of solar panels, and an electronic drive motor that is configured to cause the horizontal scissor to extend or retract. The horizontal scissor includes a plurality of beams.

In a second novel aspect, the apparatus also includes a drive shaft and drive screw. The drive shaft and drive screw are configured to extend or retract the horizontal scissor in response to movement of the electronic drive motor.

In a third novel aspect, the horizontal scissor and the electronic drive motor are coupled to a structure that conforms to the international standard for a TEU (Twenty Foot Equivalent Unit) shipping container. This allows for standard international intermodal transportation and installation by commonly available machines. Other standard container sizes include, but are not limited to 8 feet, 10 feet, 40 feet, or 53 feet container form factor.

In a fourth novel aspect, a first beam of the plurality of beams is made of a first material, and a second beam of the plurality of beams is made of a second material.

In a fifth novel aspect, a first beam of the plurality of beams is made of a first material, a second beam of the plurality of beams is made of a second material, and a third beam of the plurality of beams is made of a third material.

In a sixth novel aspect, a first beam of the plurality of beams is a first size, and a second beam of the plurality of beams is a second size. The first size of the first beam is larger than the second size of the second beam, and the first beam is closer to the twenty foot equivalent unit shipping container than the second beam when the horizontal scissor is extended.

In a seventh novel aspect, the plurality of solar panels is configured to fold when the horizontal scissor is retracted. The horizontal scissor, when fully retracted, fits into one half of the volume inside a twenty foot equivalent unit shipping container.

In an eighth novel aspect, the apparatus includes a processor configured to control the operation of the horizontal scissor.

In a ninth novel aspect, the apparatus includes an array of batteries and an electrical converter that is coupled to the array of solar panels, the array of batteries and an electrical outlet.

In a tenth novel aspect, the apparatus includes a processor configured to control the operation of the electrical converter.

Further details, embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Figure 1:
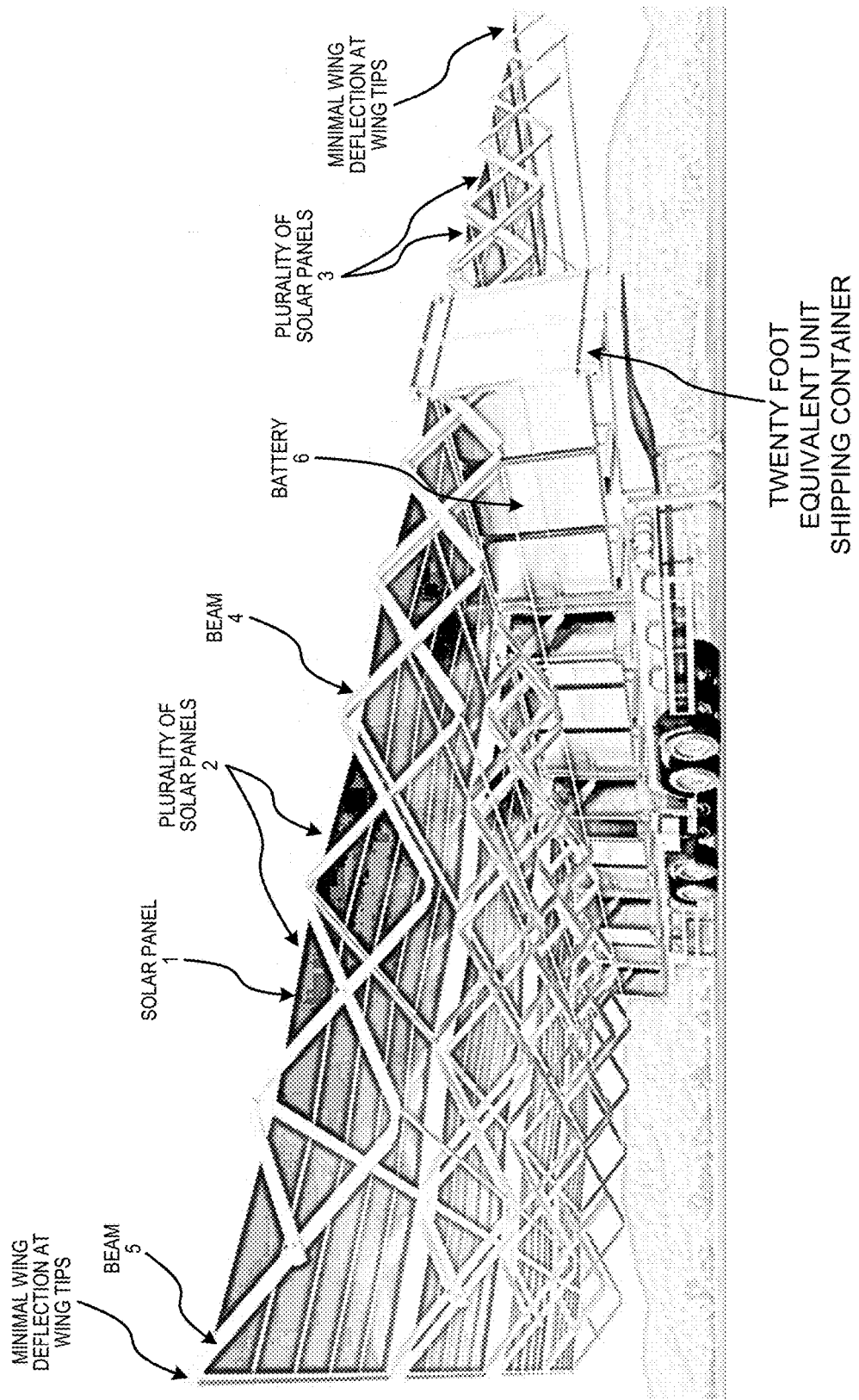
FIG. 1 is a perspective view of an articulating scissor solar array in the open position.

FIG. 1 is a perspective view diagram of the articulating scissors solar array in the open position. Multiple horizontal scissor "Dragon Wings" are attached to a shipping container. In one embodiment, the shipping container is a twenty foot equivalent unit shipping container. In a second embodiment, the shipping container is mounted on a trailer configured to be towed by a semitruck for easy relocation and positioning. There can be one or more horizontal scissor wings that extend from the shipping container. Each horizontal scissor wing supports a plurality of solar panels. For example, plurality of solar panels 2 is supported by the first horizontal scissor wing and plurality of solar panels 3 is supported by the second horizontal scissor wing. The horizontal scissor wings are configured so that the supported plurality of solar panels fold together when the horizontal scissor wings are retracted into the shipping container. When the horizontal scissor wings are fully retracted, the plurality of solar panels and the beams that form the horizontal scissor wings fold into a volume that fits within the shipping container. This allows for the shipping container to contain two horizontal scissor wings for easy shipment and relocation of the entire articulating scissor solar array. As discussed in greater detail below, the number of beams and the types of materials used to construct the horizontal scissor wings varies as a function of distance from the center of the shipping container. This variation is utilized to minimize the deflection or "bend" at the outer tips of the horizontal scissor wings. Said another way, the goal of the system is to position each of the plurality of solar panels at similar angles.

The plurality of solar panels is configured to collect solar power that is converted to electrical power and stored in an array of local batteries, such as lithium ion batteries. In one embodiment, the electrical power is converted to a desired voltage or frequency before charging the array of local batteries. In another embodiment, an electrical bypass circuit is included to provide full output power while not charging the array of batteries. In yet another embodiment, a computer system is included to control the routing of the collected solar power and the movement of the horizontal scissor wings.

Figure 2:
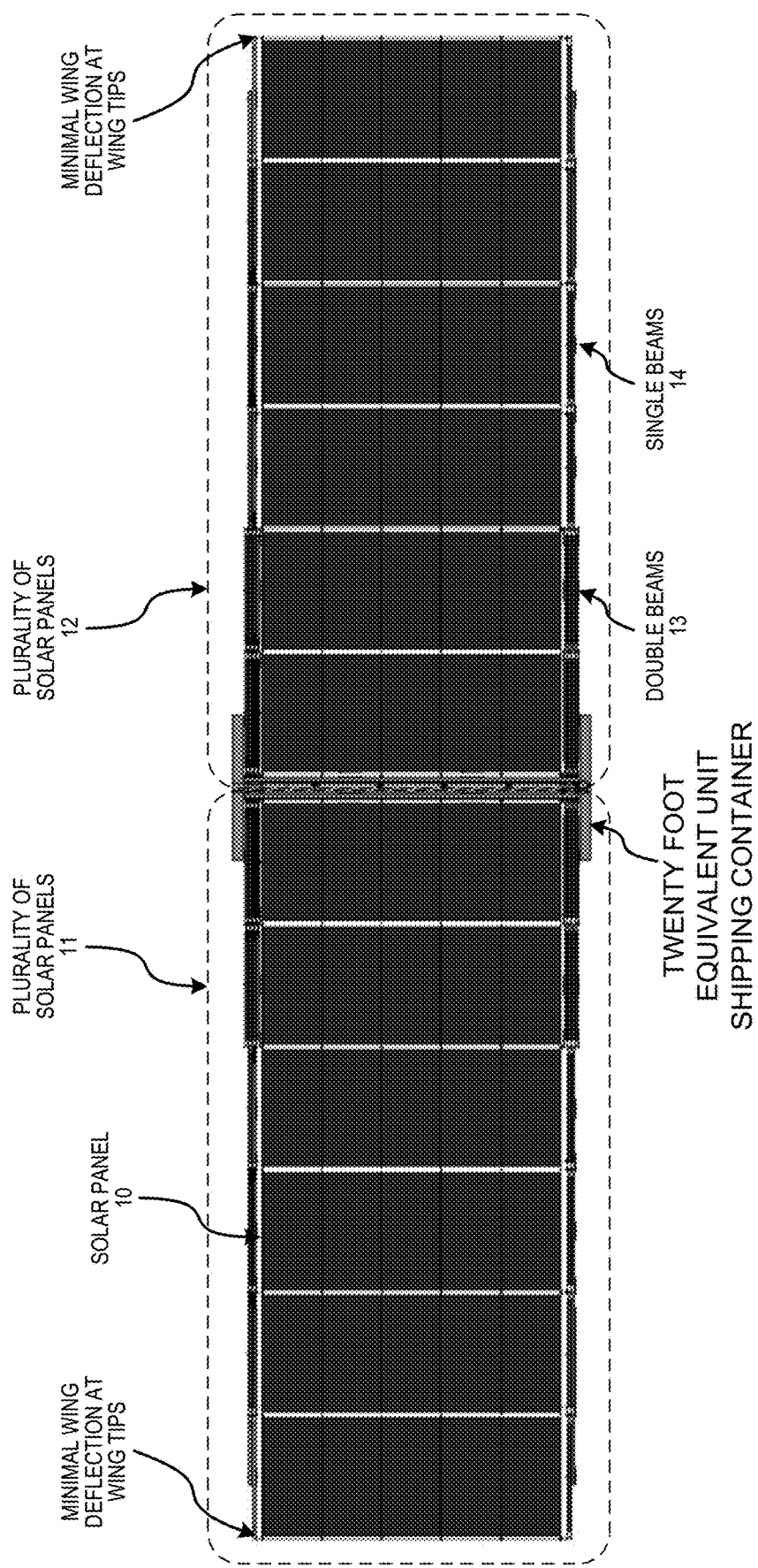
FIG. 2 is a top down view of an articulating scissor solar array in the open position.

FIG. 2 is a top view diagram of the articulating scissors solar array in the open position. Solar panel 10 is part of the plurality of solar panels 11. The articulating scissor design varies as a function of distance from the center of the shipping container. In one embodiment, the number of beams used to construct the articulating scissor design varies from double beams 13 near the center of the shipping container to single beams 14 near the wing tips of the solar panel arrays. In another aspect, the materials used to construct the articulating scissor design varies as a function of distance from the center of the shipping container. In one embodiment, the material used to construct the articulating scissor near the center of the shipping container is steel; the material used to construct the articulating scissor in the mid-part of the articulating scissor is aluminum; and the material used near the wing tip of the articulating scissor is carbon fiber. One skilled in the art, after reading this disclosure, will appreciate that other materials can be used depending on their strength, weight, rigidity, and other material characteristics. These variations of design vary as a function of distance from the center of the shipping container.

We applied these changing properties to minimize the downward deflection as the distance from the center core increases. As a result, we developed beams, scissors, wings, and core design that can be adapted to minimize tip deflection as the solar panels either decrease or increase in weight. Additionally, since the tip deflection was minimized, this results in minimizing the amount of drive power required to open and close the solar panel array.

Figure 3:
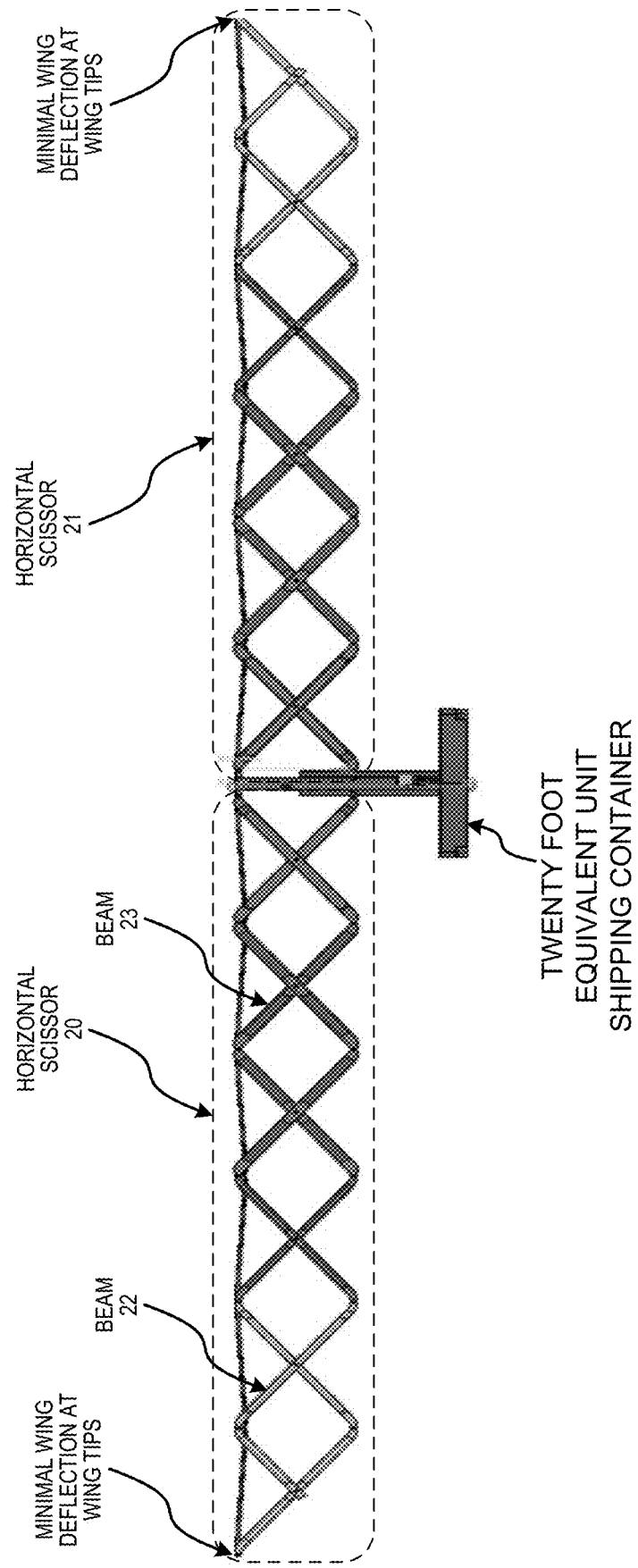
FIG. 3 is a side view of an articulating scissor solar array in the open position.

FIG. 3 is a front view diagram of the articulating scissors solar array in the open position. Beams 23 and 24 are used to construct the horizontal scissors 20 and 21. As discussed above, the deflection at the far tips of the wings is minimized by the scissor and overall wing density changes as a function of distance from the central core.

Figure 4:
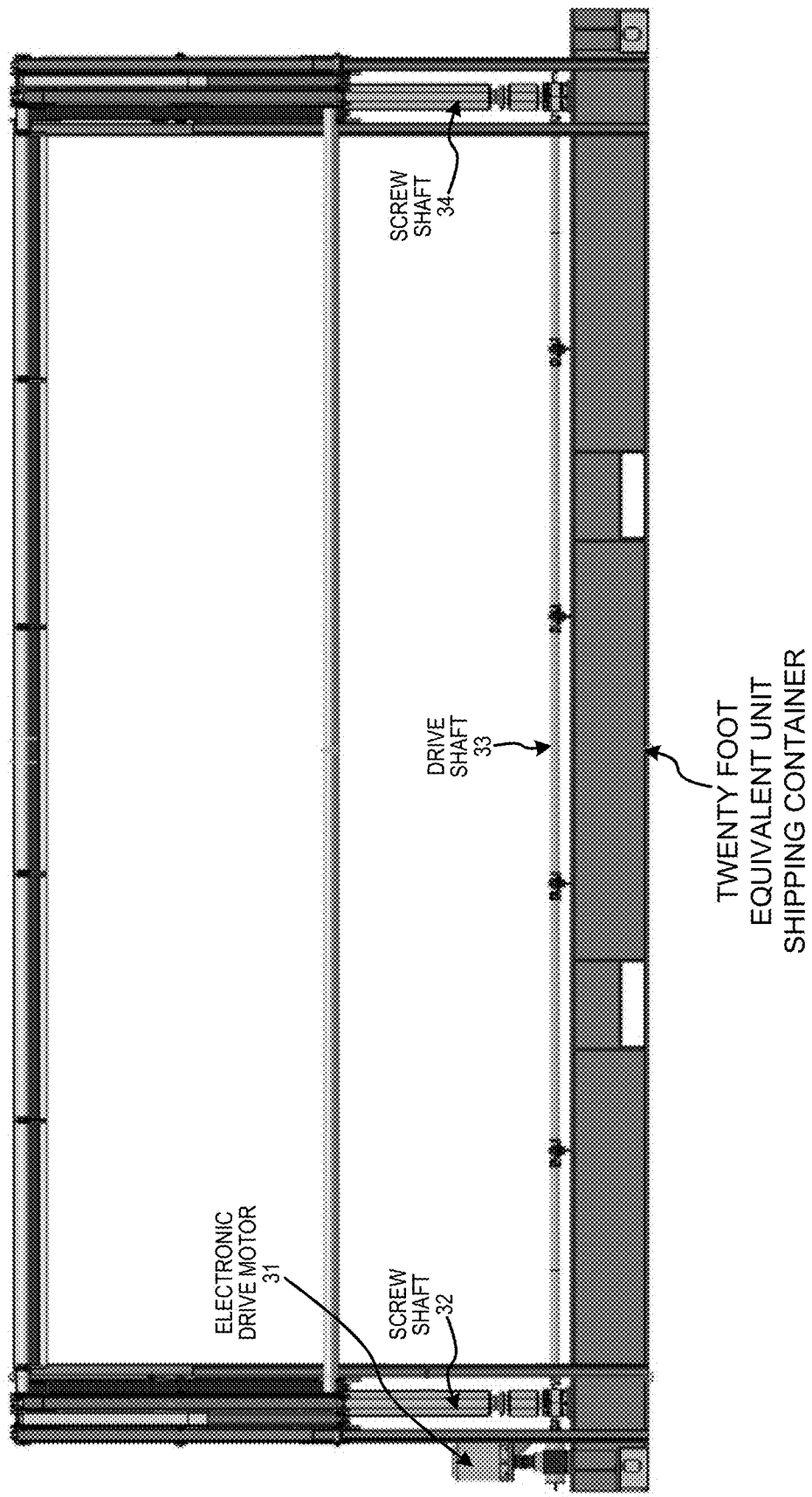
FIG. 4 is a side view of an articulating scissor solar array in the closed position.

FIG. 4 is a side view diagram of the articulating scissors solar array in the closed position. The electronic drive motor 31 connects to the drive shaft 33. Drive shaft 33 in turn rotates screw shafts 32 and 34. Rotation of screw shafts 32 and 34 cause the articulating scissors to open or close depending on the direction of rotation.

We created a design that couples all four scissors together through two screw drives, connected with a drive shaft, and a single drive motor. The result of connecting all the scissors together is that they open and close in a balanced fashion creating a stationary center of gravity while opening, closing, and while in any position between and including open and closed. The drive system can be driven at either end by a single motor, hand crank, or power drill. Further, multiple articulating scissor (also referred to as "Dragon Wings") can be driven by a single motor when connected with couplings between Dragon Wings systems.

Figure 5:
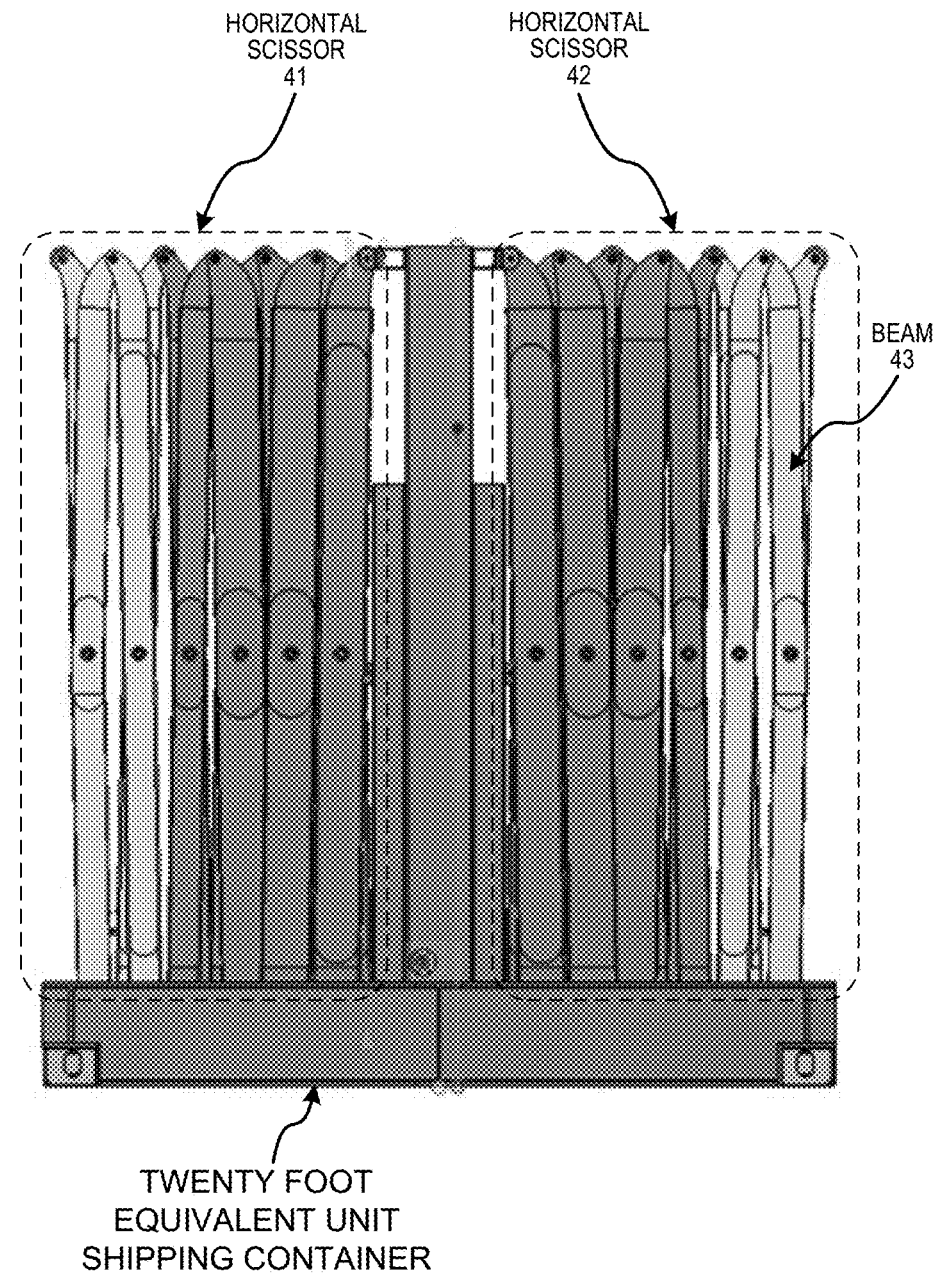
FIG. 5 is a side view of an articulating scissor solar array in the closed position.

FIG. 5 is a side view diagram of the articulating scissors solar array in the closed position. The articulating solar array is within the twenty foot equivalent unit standard size envelope. The articulating scissors and beams are designed and integrated to fit within the standard container width and height. We designed the beams dimensions to fit within the envelope of a standard shipping container when completely closed.

The relationship between the length of the scissor beam and the length of the solar panel with an independent hinge point causes the solar panel array to extend nearly flat and above shadow lines while conserving the structural integrity of the scissor beam at full extension.

Figure 6:
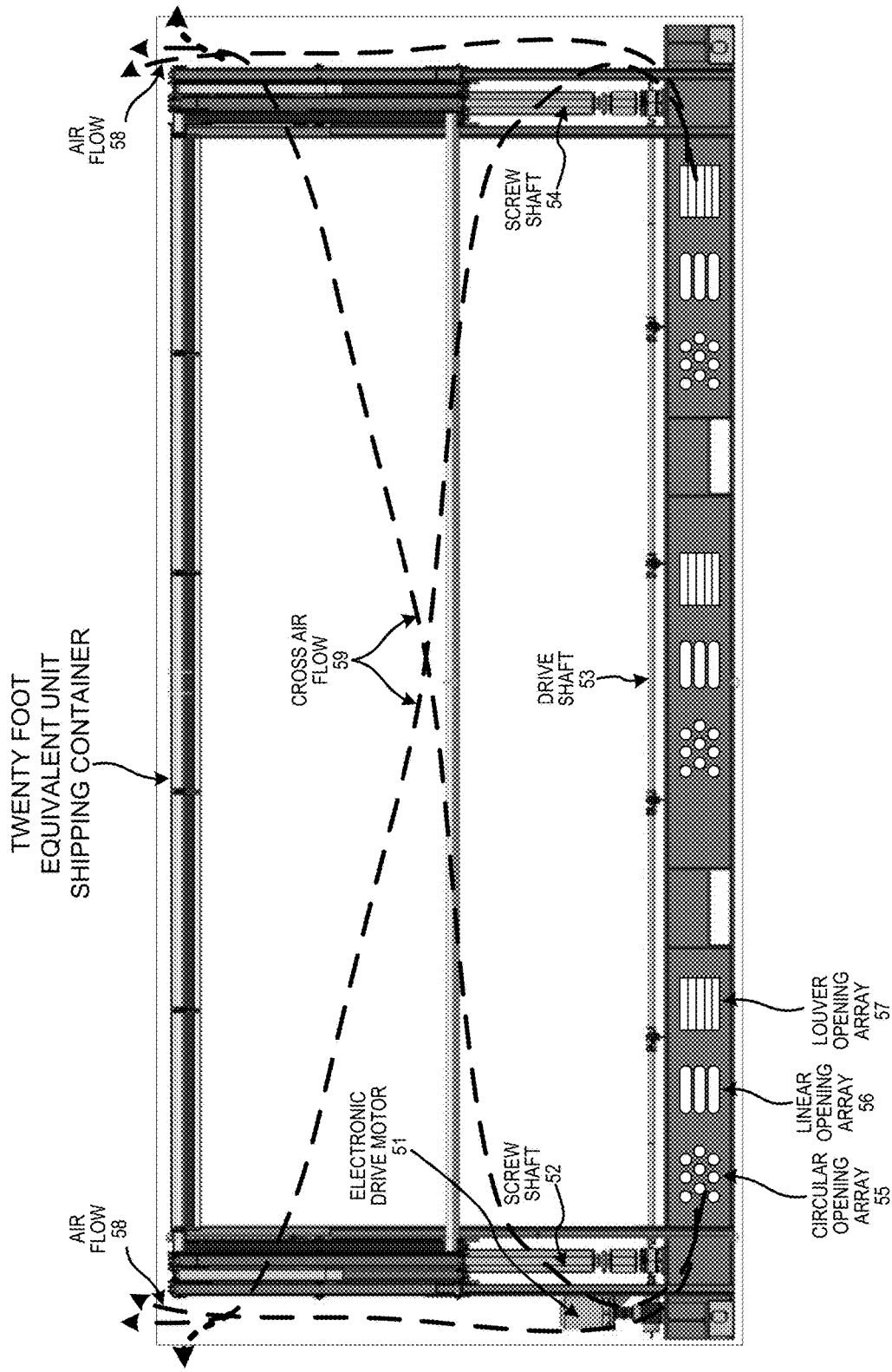
FIG. 6 is a diagram of a shipping container thermal management system.

FIG. 6 is a diagram of a shipping container thermal management system. The shipping container includes one or more input openings and one or more output openings. Air flow enters through a first input opening and exits via a second output opening. The direction of the air flow may be caused by convection. In one embodiment, convection causes cool air to flow in through a first opening located at or near the bottom of the shipping container. The cool air travels in an upward direction through the shipping container towards the second output opening. As the air travels through the shipping container the air absorbs the heat from the components within the shipping container and then exits via an opening near the top of the shipping container. In this fashion, the air flow generated from the input openings to the output openings allow for cooling of the shipping container and all components located therein. The input and output openings may be of various sizes and shapes. For example, an opening may be a circular opening array 55, a linear opening array 56, or a louver opening array 57. One skilled in the art will readily understand that many other types of openings may be used to allow air flow to enter and exit the shipping container. In the present embodiment, the shipping container includes many components that generate heat such as an electric motor, an electric power converter, a battery, and high power electrical conduit. All of these components generate significant heat during operation and therefore need such a thermal management system to regulate their operating temperature. It is also noted that the described system will be used in direct sunlight that will cause the shipping container to heat up even when not in operation. This is another reason why a thermal management system is necessary to regulate the temperature of the shipping container and all of its components.

In order to preserve the cleanliness within the shipping container, it may be necessary to utilize an air filter for one or more of the openings. In the event that utilization of an air filter significantly blocks air flow, a fan may be added to force additional air flow as necessary. Any type of air filter known in the art may be used depending on the type of hole and the type of particulates to be filtered.

Determination of the number, shape and size of holes is not only important to generate the necessary air flow, but it is also important to maintain the structural rigidity of the shipping container. One skilled in the art will realize that the use of excessive holes or excessive hole size may result in reduced rigidity and structural stability of the shipping container. Therefore, it is necessary to minimize the amount of structural degradation caused by the holes while generating the necessary air flow.

The input air holes may be located on the bottom facing surface of the shipping container or on a side surface of the shipping container near the bottom of the shipping container. The output air holes may be located on the top facing surface of the shipping container or the side surface of the shipping container near the top of the shipping container. However, openings on the top surface of the shipping container may be problematic due to particulates or moisture possibly falling into the shipping container via the openings. Therefore, the output air holes are preferably located on the side surface of the shipping container near the top of the shipping container.

Figure 7:
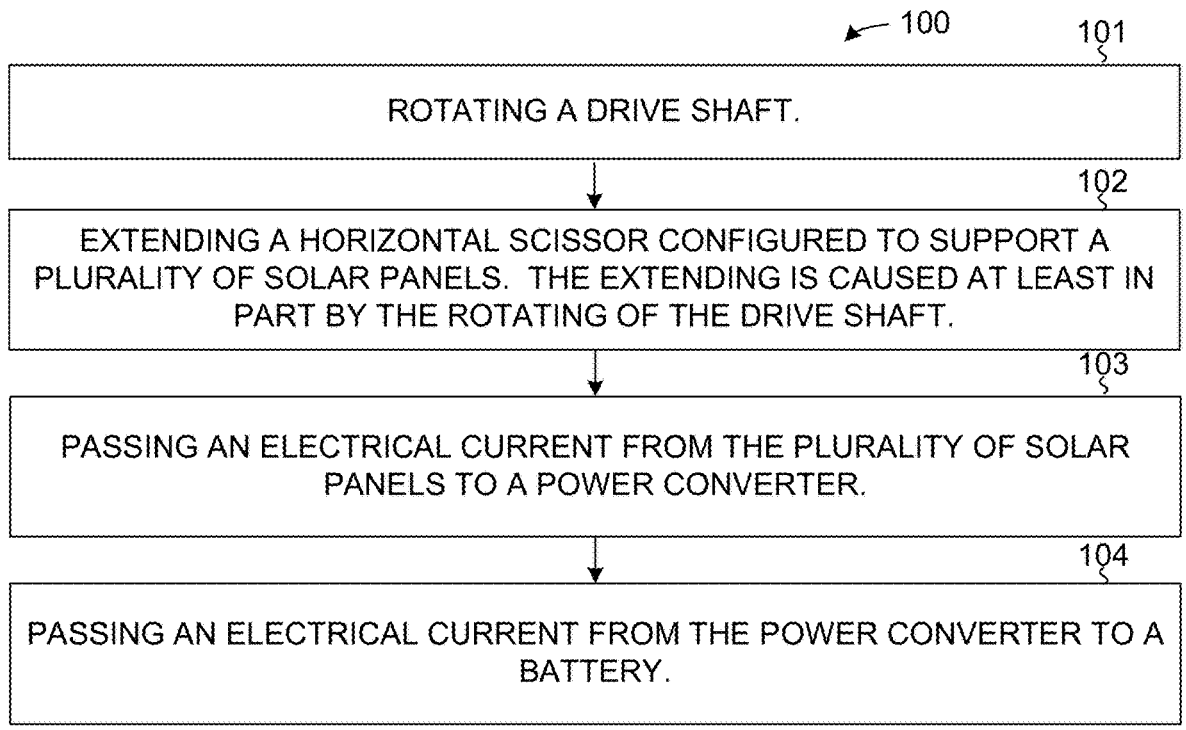
FIG. 7 is a first flowchart of an articulating scissor solar panel system.

FIG. 7 is a first flowchart 100 of an articulating scissor solar panel system. In step 101, a drive shaft is rotated. In step 102, a horizontal scissor configured to support a plurality of solar panels is extended. The extending is caused at least in part by the rotating of the drive shaft. In step 103, an electrical current is passed from the plurality of solar panels to a power converter. In step 104, the electrical current is passed from the power converter to a battery.

Figure 8:
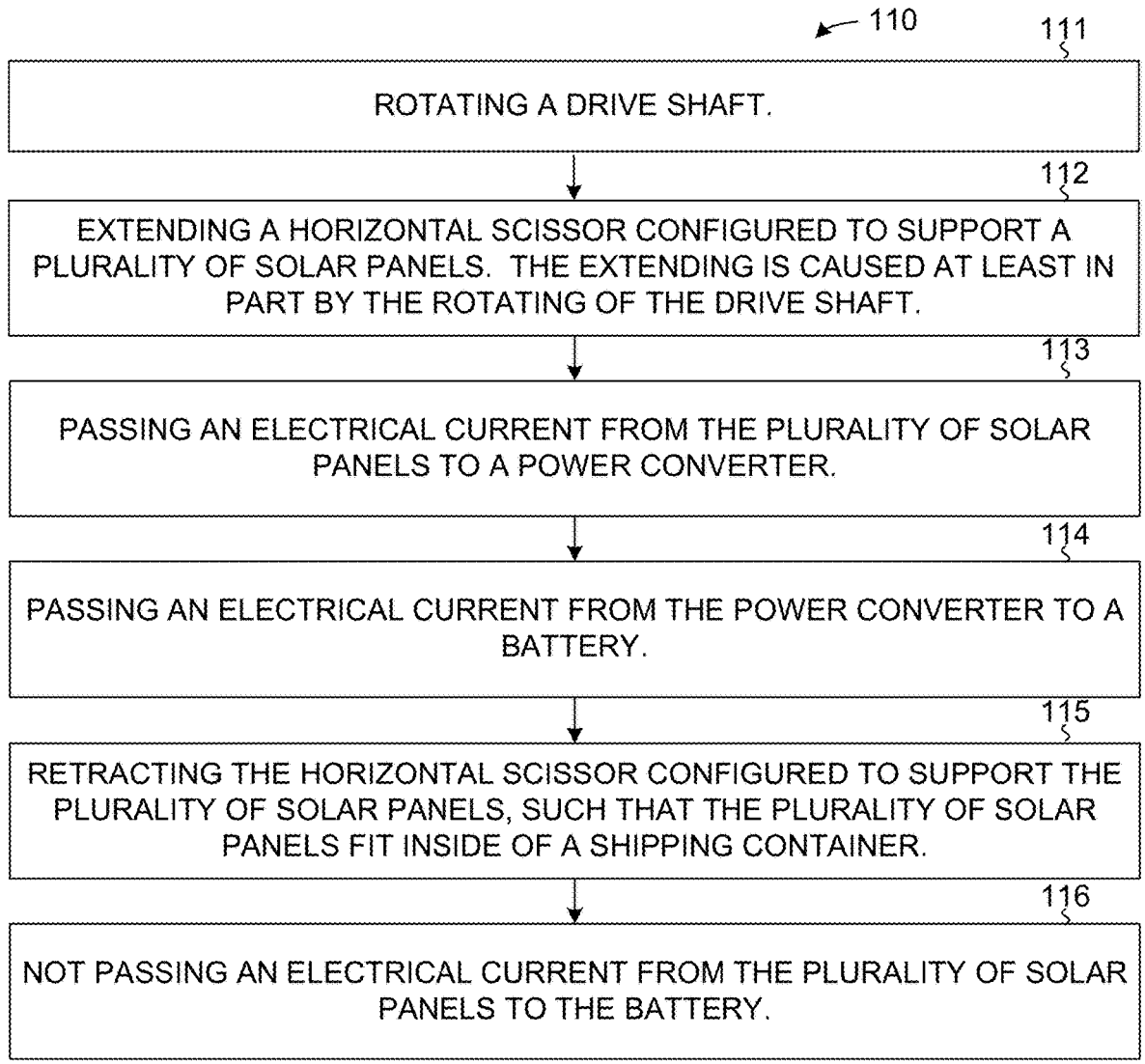
FIG. 8 is a second flowchart of an articulating scissor solar panel system.

FIG. 8 is a second flowchart 110 of an articulating scissor solar panel system. In step 111, a drive shaft is rotated. In step 112, a horizontal scissor configured to support a plurality of solar panels is extended. The extending is caused at least in part by the rotating of the drive shaft. In step 113, an electrical current is passed from the plurality of solar panels to a power converter. In step 114, the electrical current is passed from the power converter to a battery. In step 115, the horizontal scissor configured to support the plurality of solar panels is retracted, such that the plurality of solar panels fit inside of a shipping container. In step 116, an electrical current is not passed from the plurality of solar panels to the battery.

Communication Protocols

System devices, such as solar power inverters, are controlled using a ModBus protocol. Modbus protocol is popular in industrial environments because it is openly published and royalty-free. It was developed for industrial applications, is relatively easy to deploy and maintain compared to other standards and places few restrictions on the format of the data to be transmitted. The ModBus protocol uses character serial communication lines, Ethernet, or the Internet protocol suite as a transport layer. ModBus supports communication to and from multiple devices connected to the same cable or Ethernet network. For example, there can be a device that measures temperature and another device to measure humidity connected to the same cable, both communicating measurements to the same computer, via Modbus. Modbus is often used to connect a plant/system supervisory computer with a remote terminal unit (RTU) in supervisory control and data acquisition (SCADA) systems. Many of the data types are named from industrial control of factory devices, such as ladder logic because of its use in driving relays: a single-bit physical output is called a coil, and a single-bit physical input is called a discrete input or a contact.

Other system devices are controlled by a CAN bus protocol. A Controller Area Network (CAN bus) is a vehicle bus standard designed to allow microcontrollers and devices to communicate with each other's applications without a host computer. It is a message-based protocol, designed originally for multiplex electrical wiring within automobiles to save on copper, but it can also be used in many other contexts. For each device, the data in a frame is transmitted serially but in such a way that if more than one device transmits at the same time, the highest priority device can continue while the others back off. Frames are received by all devices, including by the transmitting device.

In one embodiment, a SQL database is used to store and translate instructions between the ModBus and CAN bus protocols.

Solar Tracking System

The present invention provides control as to the extension of a plurality of solar panels, as well as control of the sunlight angle of incidence on each solar panel. For example, using east-west corrugation, the plurality of solar panels can be positioned such that the plurality of solar panels is not fully extended into a flat position, but rather are partially extended such that each solar panel is positioned to an equal but opposite angle. In one embodiment, this semi-extended positioning of the plurality of solar panels provides increased sunlight energy absorption during morning hours, due to the portion of the plurality of solar panels that are near perpendicular to the rising sun in the east; and provides increase sunlight energy absorption during the afternoon hours, due to the portion of the plurality of solar panels that are near perpendicular to the falling sun in the west. Moreover, during the midday hours, the plurality of solar panels can be fully extended to position all of the plurality of solar panels to be orientated near perpendicular to the midday sunlight.

This solar tracking functionality can be controlled by the combination of the horizontal wings supporting the plurality of solar panels, the electrical motor, the processor configured to control the electrical motor, and software running on the processor that determines the optimum orientation of the plurality of solar panels at each moment of operation.

It is also noted herein that maximum power point tracking can be used to determine the optimum orientation of the plurality of solar panels to generate the maximum power collected by the system. In this fashion, the system varies the orientation of the plurality of solar panels while measuring the power collected at each orientation, then determines the orientation of the plurality of solar panels that resulted in the maximum power collection and then sets the orientation of the plurality of solar panels accordingly.

In another embodiment, the system uses a downloaded sun angle schedule to control the orientation of the plurality of solar panels to maximize solar power generation.

External Power Supply

In one embodiment, the solar panel array may be disabled and the batteries in the system can be charged from an external power source, such as gas power generator, an external electric grid, or an automobile.

In another embodiment, the solar panel array may be enabled so that the batteries in the system are charted from the solar panel array in addition to an external power source, such as gas power generator, an external electric grid, or an automobile.

The system can be configured to operate in synchronization with the electrical grid or off-grid in an electrical island mode. The processor may coordinate or synchronize multiple Dragon Wings AC inputs and outputs, multiple DC inputs and outputs between batteries, solar PV, other DC generators and loads, and electric vehicles.

Single-End System Elevation

To improve the angle of incidence of the sunlight on the plurality of solar panels, it may be beneficial to elevate one end of the system so that the plurality of solar panels is orientated closer to perpendicular to the irradiating sunlight. For example, when the system is located in the northern hemisphere, it may be beneficial to elevate the northern end of the system so that the plurality of solar panels faces more southerly so to absorb more of the irradiating sunlight. Alternatively, when the system is located in the southern hemisphere, it may be beneficial to elevate the southern end of the system so that the plurality of solar panels faces more northerly so to absorb more of the irradiating sunlight.

Safety Control System

In another embodiment, the system may include a video monitoring system. This video monitoring system can operate to ensure safe operation and aid in theft events. For example, when the horizontal wings are extending, the system can utilize the video monitoring system to ensure that no persons or objects are in the extension path of the horizontal wings. When an obstacle is detected to be in the extension path of the horizontal wings, the system can sound an alert and stop the operation of the horizontal wing extension.

In the scenario of theft, the video monitoring system can either transmit the collected video and communicate the video data to an offsite server which can be utilized by law enforcement agencies to apprehend the stolen equipment and those complicit in the theft. Also, the video data collected by the video monitoring system can be stored in a hidden storage unit (black box) within the physical system, so that the video data collected during the theft can be used after the physical system is reclaimed.

Bi-Facial Solar Panels

In one embodiment, the plurality of solar panels includes bi-facial solar panels in that the solar panels can absorb light from both the top and bottom surface of the solar panel. In operation, the light reflection, or "light bounce", off the ground below the solar panel array irradiates the bottom surface of the solar panel and allows for additional solar power absorption by the solar panel array.

Environmental Phenomena Monitoring and Protection

In another embodiment, the system includes one or more vibration sensors. The one or more vibration sensors are configured to communicate with a processor in the system. The vibration sensor can measure frequency and or amplitude. In one example, the sensor frequency and amplitude measurements are averaged over a set duration of time. The duration of time may be programmable depending on the operating environment. The vibration data is used to determine the orientation of the plurality of solar panels so to avoid damage due to excessive environmental phenomena such as wind, rain, hail, snow, lightning, tornados, etc.

In a second embodiment, there are one or more vibration sensors located on each horizontal scissor, so that environmental phenomena can be measured independently on each horizontal scissor. For example, one horizontal scissor may be experiencing high wind speeds, while the other horizontal scissor is not experiencing high wind speeds. Therefore, optimum operation would allow solar power collection by one horizontal scissor, while disabling solar power collection on the second horizontal scissor.

In yet another embodiment, the system is connected to a weather forecasting data service. The weather forecasting service data is used to determine the orientation of the plurality of solar panels so to avoid damage due to excessive environmental phenomena such as wind, rain, hail, snow, lightning, tornados, etc.

In addition to one or more vibration sensors, the system may include a microphone sound sensor that is configured to listen for loud sounds such as thunder from a lightening storm. For example, when the system detects one or more thunder sounds, then the system can determine that a lightening storm is present and then close the horizontal scissors so to protect the system during the lightning storm. Then, once the microphone sound sensors have not detected a thunder sound for a preset duration of time, the system determines that the lightning storm has ended, and the system can extend the horizontal scissors and resume operation.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus, comprising:
   a first screw shaft;
   a second screw shaft;
   a container, wherein the first screw shaft is located proximate to a first end of the container, and wherein the second screw shaft is located proximate to a second end of the container;
   a first plurality of solar panels;
   a first horizontal scissor configured to support the first plurality of solar panels, wherein the first horizontal scissor includes a plurality of beams, wherein the first horizontal scissor is attached to the container;
   wherein an active surface, configured to absorb sunlight energy, of each solar panel in the first plurality of solar panels faces an active surface of another one of the solar panels in the first plurality of solar panels when the horizontal scissor is fully contracted;
   wherein a first peak of the first horizontal scissor is connected to one of the first plurality of solar panels, and a second peak that is sequential to the first peak of the horizontal scissor is not directly connected to any of the first plurality of solar panels;
   wherein each solar panel in the first plurality of solar panels is configured to rotate from a substantially vertical orientation to a substantially horizontal orientation as the first horizontal scissor is extended from a contracted position to an extended position; and
   a drive shaft that is configured to: (i) cause, at least in part, the first and second screw shafts to rotate, and (ii) cause, at least in part, the first horizontal scissor to extend or retract, wherein the first plurality of solar panels are configured to form a horizontal plane located at a height approximately equal to a height of the container when the first plurality of solar panels are fully extended.

2. The apparatus of claim 1, further comprising:
   an electric motor, wherein the drive shaft is configured to be rotated by the electric motor.

3. The apparatus of claim 1,
a second plurality of solar panels; and
a second horizontal scissor configured to support the second plurality of solar panels, wherein the drive shaft is configured to cause the second horizontal scissor to extend or retract.

4. The apparatus of claim 1, wherein a first beam of the plurality of beams is made of a first material, and wherein a second beam of the plurality of beams is made of a second material.

5. The apparatus of claim 1, wherein a first beam of the plurality of beams is a first size, and wherein a second beam of the plurality of beams is a second size.

6. The apparatus of claim 5, wherein the first size of the first beam is larger than the second size of the second beam, and wherein the first beam is closer to the container than the second beam when the first horizontal scissor is extended.

7. The apparatus of claim 1, wherein the first plurality of solar panels is configured to fold when the first horizontal scissor is retracted.

8. The apparatus of claim 1, wherein the first horizontal scissor, when fully retracted, fits into one half, or less, of the volume inside the container.

9. The apparatus of claim 8, wherein the container is approximately twenty feet long.

10. The apparatus of claim 1, further comprising:
a processor configured to control the operation of the first horizontal scissor; and
a data communication device configured to communicate data across a network.

11. The apparatus of claim 1, further comprising:
a battery; and
an electrical converter that is coupled to the first plurality of solar panels and the battery.

12. The apparatus of claim 11, further comprising:
a processor configured to control the operation of the electrical converter.

13. The apparatus of claim 1, further comprising:
a first opening in the container; and
a second opening in the container, wherein the first opening and the second opening are configured such that a flow of air enters the first opening, travels through at least a portion of the container, and exits the second opening.

14. The apparatus of claim 13, wherein convection causes the flow of air to enter the first opening and exit the second opening.

15. The apparatus of claim 13, wherein the flow of air is configured to flow near an electronic drive motor, a battery, or an electrical converter.

16. The apparatus of claim 13, further comprising:
an air filter, wherein the air filter is configured to prevent a particulate from entering the first opening or the second opening.

* * * * *